United States Patent [19]

Daley

[11] Patent Number: 5,485,300

[45] Date of Patent: Jan. 16, 1996

[54] OPTICAL TRANSMITTER AND POWER SETTING METHOD IN OPTICAL TRANSMITTERS FOR USE IN OPTICAL NETWORKS

[75] Inventor: Robert Daley, Great Malvern, United Kingdom

[73] Assignee: Fujitsu Limited, Kanagawa, Japan

[21] Appl. No.: 285,228

[22] Filed: Aug. 3, 1994

[30] Foreign Application Priority Data

Aug. 4, 1993 [GB] United Kingdom ............... 9316171

[51] Int. Cl.$^6$ .............. H04B 10/04; H01S 3/13
[52] U.S. Cl. .............. 359/180; 359/187; 359/186; 359/137; 372/29; 372/30
[58] Field of Search .............. 359/186, 187, 359/180; 372/29, 30, 31

[56] References Cited

U.S. PATENT DOCUMENTS

| | | | |
|---|---|---|---|
| 4,977,593 | 12/1990 | Ballance | 359/118 |
| 5,293,263 | 3/1994 | De Rijck | 359/187 |
| 5,303,248 | 4/1994 | Gibbs | 372/30 |
| 5,311,005 | 5/1994 | Visocchi | 359/187 |
| 5,323,408 | 6/1994 | Hahn et al. | 372/29 |

FOREIGN PATENT DOCUMENTS

WO9111867 8/1991 European Pat. Off. .

*Primary Examiner*—Leo H. Boudreau
*Assistant Examiner*—Bhavesh Mehta

[57] ABSTRACT

An optical transmitter for use, for example in a TPON (telecommunications over passive optical networks) network, has a servo circuit for controlling the optical output power of an optical source of the transmitter. In a power setting operation used for bringing the output power to a demand level when the transmitter is first connected to the network, the servo circuit causes the source to produce a series of optical pulses and monitors the power of the pulses using an optical sensor coupled optically to the source. If the modified power level of a pulse is less than the demand level then in the next pulse the drive signal value ($I_D$) applied to the source is increased, relative to the drive signal value for the present pulse, by a predetermined adjustment amount, whereas if the monitored power level is greater than the demand level the drive signal value is decreased by the predetermined adjustment amount. The drive signal value for the first pulse is half the full scale drive signal value, and the predetermined adjustment amount is initially one-quarter of the full scale drive signal value and is thereafter halved for each successive pulse. The power setting operation in the optical transmitter described is desirably fast and accurate.

7 Claims, 5 Drawing Sheets

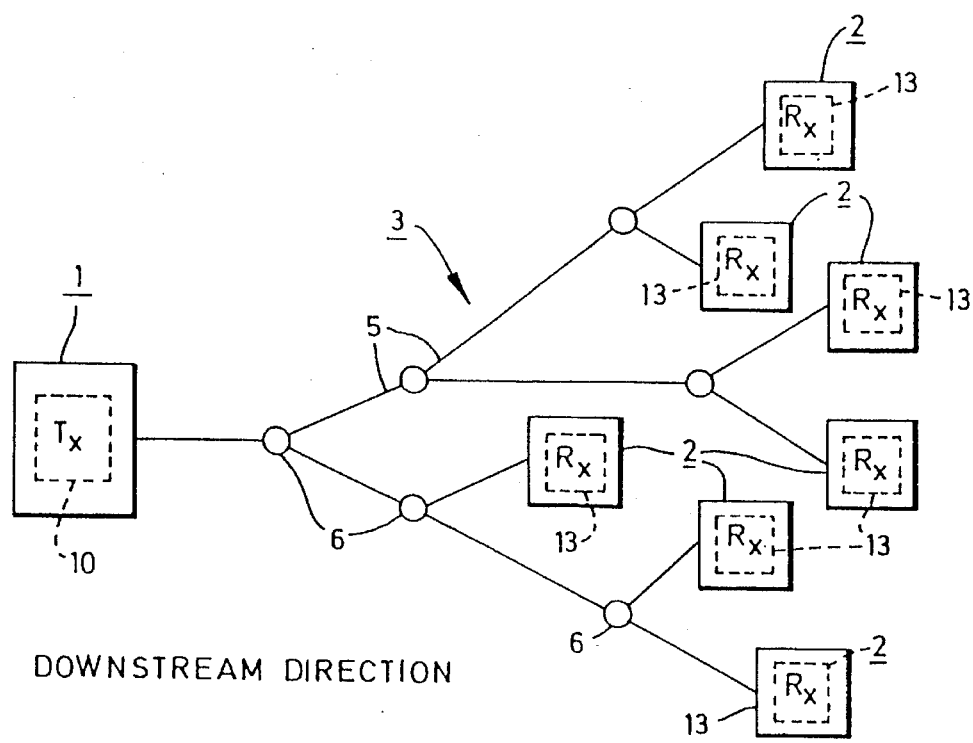
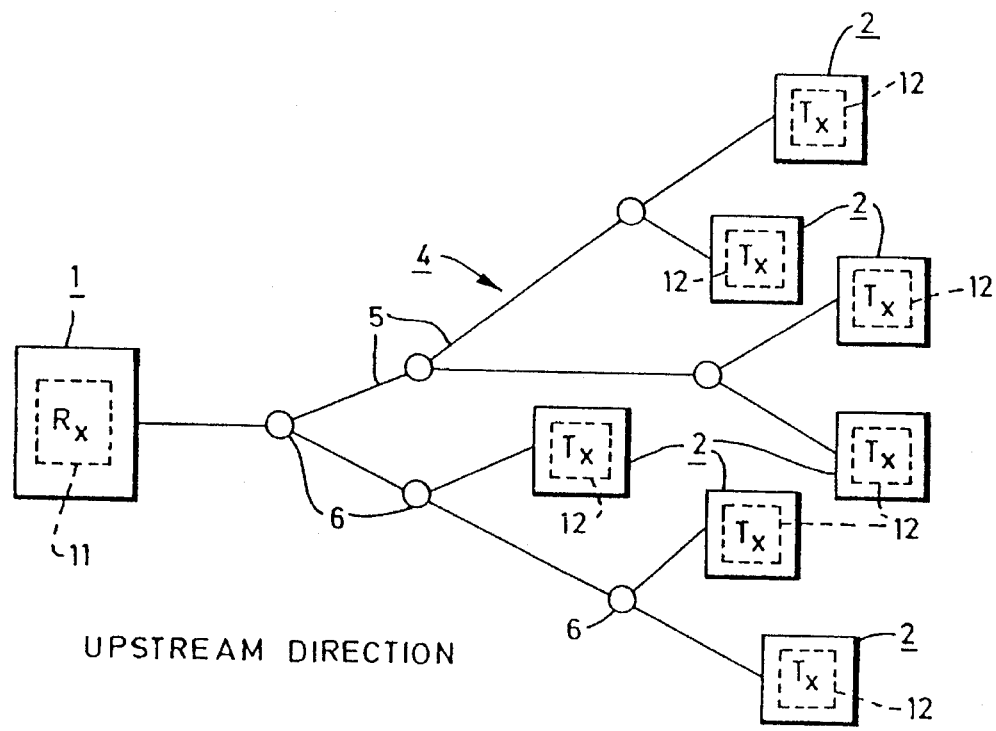
FIG. 1

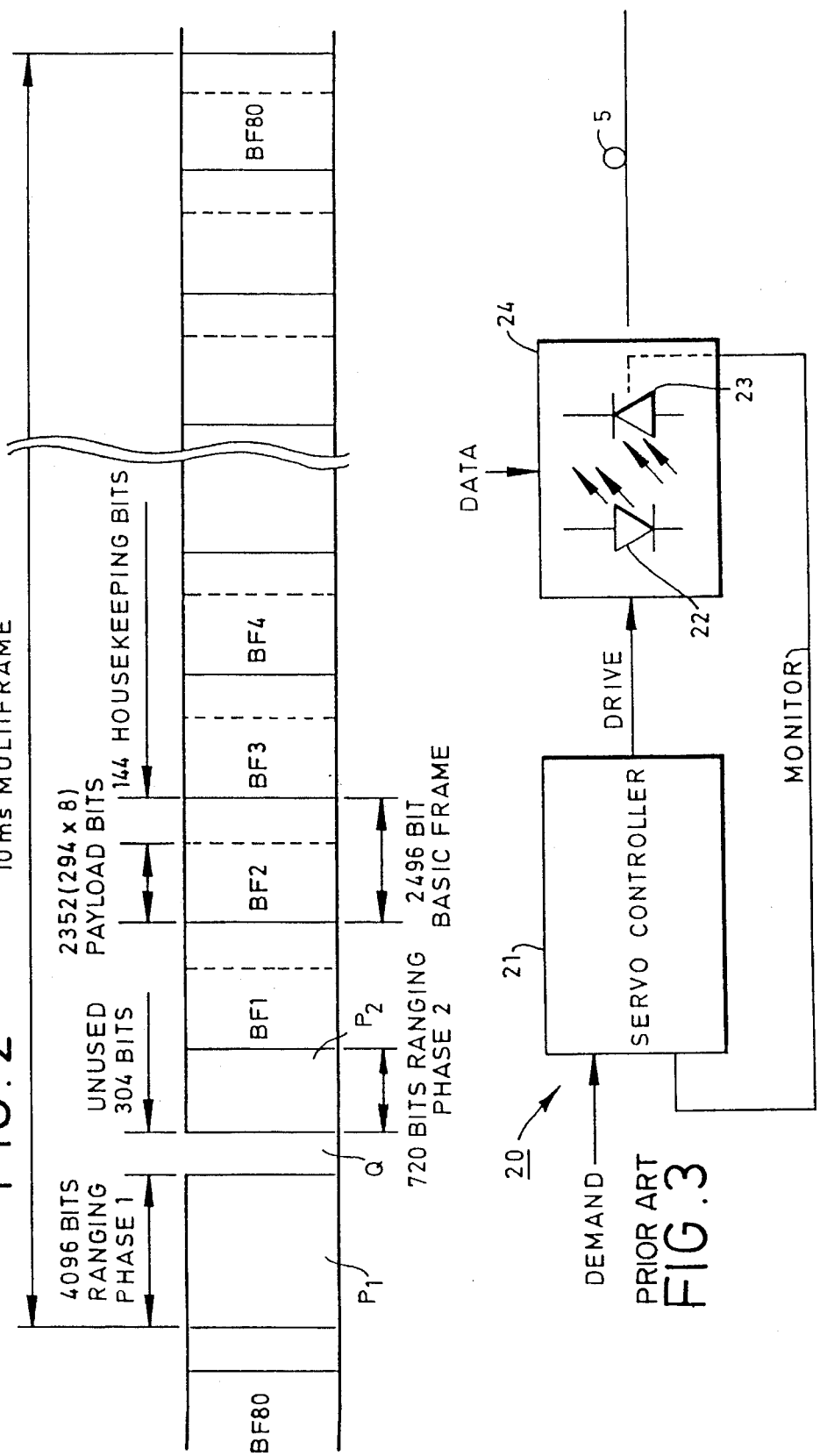

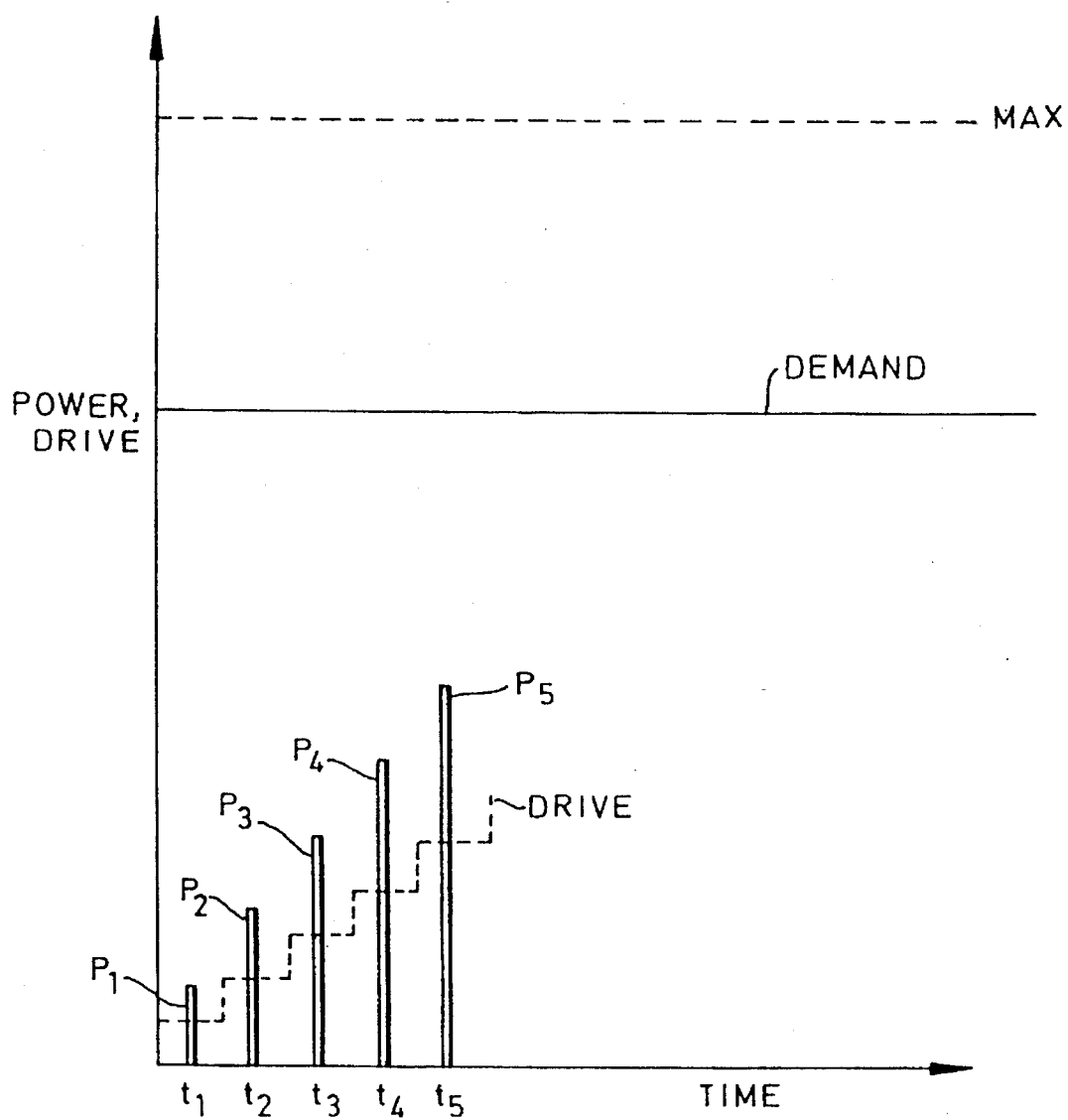

OPTICAL TRANSMITTER AND POWER SETTING METHOD IN OPTICAL TRANSMITTERS FOR USE IN OPTICAL NETWORKS

BACKGROUND OF THE INVENTION

1. Field of the Invention

The present invention relates to optical transmitters for use, for example, in a TPON (telecommunications over passive optical networks) network.

2. Description of the Prior Art

In a TPON network, a network head-end station (for example a telephone exchange) is linked to a plurality of remote terminations (for example street distribution points) by a passive optical splitting network (PON). There may be separate PONs for the downstream (head-end to terminations) and upstream (terminations to head-end) data directions.

In the TPON network, according to a bit transport system (BTS) proposed by British Telecommunications PLC, in the downstream direction data is broadcast by the head-end station to all the terminations in the network in a time division multiple access (TDMA) multiplexed frame (multiframe). In the upstream direction, the terminations transmit, one at a time, data pulses in predetermined time slots so that the data pulses reaching the head-end station from the different terminations are interleaved to form an upstream TDMA multiframe having a predetermined format.

Each remote termination includes an optical transmitter for producing optical signals in dependence upon the data pulses to be transmitted in the upstream TDMA multiframe to the head-end station. The optical transmitter includes an optical source, normally a semiconductor laser, to which electrical drive signals are applied to modulate the optical output power of the optical source. In view of unavoidable variations in optical output power from one optical source to the next for the same drive signal, and also of drift in the optical output power with age and temperature, the optical output power of the optical source is desirably controlled by a servo circuit. Such a servo circuit uses an optical sensor arranged, for example in the same package as the optical source, for monitoring the optical output power of the source so as to produce monitoring signals dependent upon the output power. The servo circuit applies drive signals to the optical source for controlling the optical output power thereof, in dependence upon the monitoring signals provided by the optical sensor, so as to tend to maintain that output power at a predetermined demand level during use of the transmitter.

When a transmitter is first connected to the network, or following an interruption in the transmitter power supply, the output power of the optical source is required to reach the predetermined demand level quickly and accurately. In a previously considered transmitter a so-called linear power setting operation has been performed for this purpose, in which the drive signals applied to the optical source at successive time instants are increased by a fixed adjustment amount and the resulting output power is monitored using the monitoring signals provided by the optical sensor. In such a linear power setting operation the drive signal accordingly increases linearly, from zero towards a predetermined maximum drive signal value, until it is determined that the optical output level, as measured by the optical sensor, has reached the predetermined demand level.

In the linear power setting operation the fixed adjustment amount, by which the drive signal changes from one time instant to the next, is set in dependence upon the desired accuracy of the power setting operation. For example, if it is required to set the optical output power to within 1% of the predetermined demand level, the adjustment amount must be 1% or less of the maximum drive signal value. Thus, for relatively high demand levels, the linear power setting operation requires up to 100 time instants to achieve 1% power setting accuracy.

In a data communications network such as a TPON network there are normally many terminations (for example up to 128) connected to the network. Linear power setting, as described above, is undesirable in such a data communications network. In this respect, in order that existing terminations can continue to operate uninterruptedly when a new termination is first connected to the network, a predetermined time slot is normally reserved periodically for network initialisation purposes. For example, in a TPON network using the BTS system mentioned above, an initial portion of each upstream TDMA frame is reserved for such purposes and, when first activated, a newly-connected termination must confine its optical transmissions to this initial portion to avoid upsetting operation of the existing terminations.

To achieve high efficiency in utilization of the TDMA multiframe for data transmission, the initial portion of the frame used for network control purposes should desirably be of a very short duration, so that in practice only one value of drive signal can be tried by a termination in each TDMA multiframe. As the duration of each TDMA frame is 10ms in the BTS system, it can take 2–3 seconds to set the optical output power of a newly-connected termination when linear power setting to a typical accuracy of 0.4% is performed.

When an entire TPON network is first initialized, power setting is required by all the terminations. Since only one termination can perform a power setting operation at any one time (because of the possibility of intersymbol interference if more than one termination transmits at a time) power setting by a network having 128 terminations can take up to 6 minutes. Thus, there is an unacceptably long delay before the network is available for use by all the terminations.

BRIEF SUMMARY OF THE INVENTION

According to a first aspect of the present invention there is provided an optical transmitter comprising:

an optical source;

an optical sensor coupled optically to said optical source for producing monitoring signals indicative of the optical output power thereof; and drive means, connected to said optical sensor for receiving therefrom said monitoring signals and also connected to said optical source for applying thereto drive signals, for controlling the optical output power thereof, and having a power setting mode in which said drive means are operable to apply a first drive signal, having a value equal to half a predetermined maximum drive signal value, to the optical source at a first time instant and to determine, on the basis of the monitoring signal, whether the optical output power of the optical source for the first drive signal value exceeds a predetermined demand level and if so to apply a second drive signal to the optical source at a second time instant, the value of the second drive signal being made smaller than the first drive signal value by one-quarter of said predetermined maximum drive signal value, whereas if the optical output power for the first drive signal value is less than the predetermined demand level the second drive signal value is made greater than the first drive signal value by one-quarter of said predetermined maximum drive signal value, and so on applying further drive signals such that the difference between one of the drive signal values and the next is one-half that between the one drive signal value and the immediately-preceding drive signal value.

In such an optical transmitter the optical output power can be set to an accuracy of one part in $2^n$ in n time instants. For example, in a TPON network operating according to the BTS system, a power setting operation for an individual termination can be completed in less than 100ms to an accuracy of 1 part in 256 (0.4%), and power setting of an entire network consisting of 128 terminations can be completed in under 10 seconds, as compared to up to 6 minutes in the case of the previously-used linear power setting operation.

In a transmitter for use in a TDMA network, such as a TPON network operative according to the bit transport system mentioned above, the drive signals may be drive signal pulses produced respectively at the said time instants, in which case the optical source is advantageously turned off in the intervals between drive signal pulses. A transmitter embodying the present invention can perform satisfactory power setting even when the pulse duration is short in comparison with the interval between pulses.

In a TPON network, the optical pulses produced by the drive signal pulses during the power setting operation can be phase 1 ranging pulses.

In a preferred embodiment, the drive means include ramp signal generation means operative to produce a ramp signal which changes linearly in amplitude from one time instant to the next, and drive signal generation means connected to the said ramp signal generation means for receiving therefrom the ramp signal and operative to produce the drive signals in dependence upon the ramp signal amplitude at the said dependence upon the ramp signal amplitude at the said time instants. The use of a ramp signal to control the drive signal generation means is advantageous in that it avoids step changes in the drive signal generation means which might lead to unpredictable results.

The ramp signal generation means may include a current generator operative in the interval between one time instant and the next to produce a constant current whose sign and magnitude are selected by control signals applied to the current generator by servo control means of the transmitter. An integrator is connected for receiving the constant current and is operable to integrate that current over the said interval so as to produce the required ramp signal. Such an arrangement can provide an accurate but cost-effective ramp signal generator which is easily controlled by the servo control means.

According to a second aspect of the present invention there is provided a method for setting the optical output power of an optical transmitter, the transmitter comprising an optical source connected for receiving drive signals used to control the optical output power thereof and also comprising an optical sensor coupled optically to said optical source for producing monitoring signals indicative of said optical output power;

in which method:

a first drive signal, having a value equal to half a predetermined maximum drive signal value, is applied to said optical source at a first time instant and it is determined, on the basis of the monitoring signal, whether the optical output power of the optical source for the first drive signal value exceeds a predetermined demand level and if so a second drive signal is applied to the optical source at a second time instant, the value of the second drive signal being made smaller than the first drive signal value by one-quarter of said predetermined maximum drive signal value, whereas if the optical output power for the first drive signal value is less than said predetermined demand level the second drive signal is made greater than the first drive signal value by one-quarter of said predetermined maximum drive signal value;

and so on applying further drive signals such that the difference between one drive signal value and the next is one-half that between the one drive signal value and the immediately-preceding drive signal value.

BRIEF DESCRIPTION OF THE DRAWINGS

FIG. 1 shows a block diagram of a TPON network;

FIG. 2 shows a diagrammatic representation of an upstream TDMA frame in the TPON network of FIG. 1;

FIG. 3 shows a block diagram of parts of an optical transmitter previously used in a TPON network;

FIG. 4 shows a graph for explaining a linear power setting operation performed by the FIG. 3 optical transmitter;

DETAILED DESCRIPTION OF THE PREFERRED EMBODIMENTS

Figure 5:
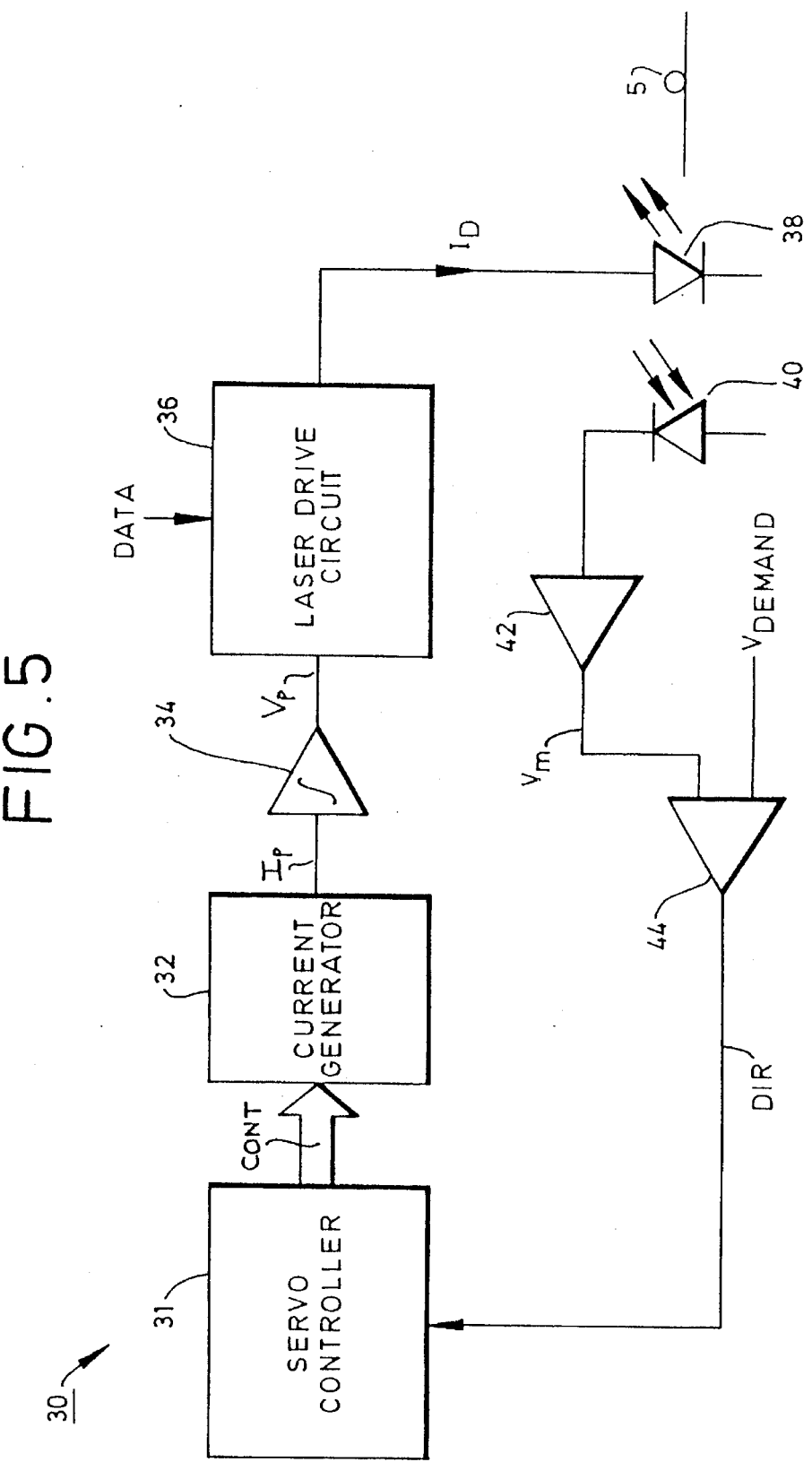
FIG. 5 shows a block diagram of parts of an optical transmitter embodying the present invention.

A TPON network, as shown in FIG. 1, includes a network head-end station 1 located at a central site which may, for example, be a telephone exchange. The network also includes a plurality of terminations 2 which may, for example, be located respectively at street distribution points.

In the example shown in FIG. 1, two separate passive optical splitting networks (PON) 3 and 4 are used to link the network head-end station 1 to the terminations 2.

The PON 3 is used to convey optical signals in the downstream direction, from the network head-end station 1 to the terminations 2. The PON 4 is used to convey optical signals in the upstream direction, from the terminations 2 to the network head-end station 1. Each PON 3 or 4 includes lengths of optical fibre 5 and passive optical splitters 6. The maximum distance between a termination 2 and the head-end station 1 is typically less than 10 km.

The head-end station 1 includes a common optical transmitter 10 for launching optical signals into the PON 3 for the downstream direction, and a common optical receiver 11 for receiving optical signals from the PON 4 for the upstream direction. Similarly, each termination 2 includes an optical transmitter 12 for launching optical signals into the appropriate branch of the upstream PON 4, and an optical receiver 13 for receiving optical signals from the appropriate branch of the downstream PON 3.

Data is transmitted over the PONs 3 and 4 in accordance with a bit transport system (BTS) proposed by British Telecommunications PLC. In the upstream direction, the optical transmitter 12 of each termination 2 transmits optical data pulses in predetermined time slots allocated to the termination concerned so that the optical data pulses reaching the head-end station 1 from the different terminations 2 are interleaved to form an upstream TDMA multiframe having a predetermined format as shown in FIG. 2. The upstream TDMA frame is of duration 10 ms and, apart from an initial portion, or header, used for network control purposes, consists of bit-or byte-interleaved data from the different terminations 2.

As shown in FIG. 2, the initial portion of each upstream TDMA frame includes a phase 1 ranging portion $P_1$ of duration 200 µs, followed by a quiet phase Q of duration 15 µs, which is in turn followed by a phase 2 ranging portion $P_2$ of duration 35 µs. Ranging operations can be performed, in the phase 1 and phase 2 ranging portions $P_1$ and $P_2$ of each TDMA multiframe, in order to ensure that each termination 2 transmits its optical data pulses at the appropriate times such that the pulses from the termination arrive at the head-end optical receiver 11 in their allocated time slots. As FIG. 1 shows, within a TPON network the distance, between a termination and the head-end station, may vary considerably from one termination to another. This means that the propagation delays experienced by optical pulses from terminations near to the head-end station will be less than the delays experienced by optical pulses from distant terminations. The ranging operations are therefore required to enable each termination to fractionally adjust the temporal position of its optical transmissions to accommodate such variations in propagation delay.

A phase 1 ranging operation is carried out by a termination 2 when it is first connected to the network. As part of the ranging operation, the optical transmitter 12 of such a newly-connected termination 2 is required to transmit a series of ranging pulses, in the phase 1 ranging portions $P_1$ respectively of successive upstream TDMA multiframes, to the head-end station optical receiver 11. To avoid interfering with the operation of existing terminations, a newly-connected termination 2 may only transmit during the phase 1 ranging portion of each TDMA frame until properly ranged. This means that the optical source within the newly-connected termination can only be activated for a limited period in each TDMA multiframe. Using only the limited time (200 µs in every 10 ms) allocated to phase 1 ranging, therefore, when a newly-connected termination is activated its optical source must reach its intended operating optical output power as quickly as possible.

FIG. 3 shows parts of a previously-considered optical transmitter for use in a TPON network. The optical transmitter 20 includes a servo controller 21, an optical source 22, for example a semiconductor laser, and an optical sensor 23, for example a photodiode. The optical source 22 and optical sensor 23 are preferably formed in a common optical package 24 to ensure reliable and consistent optical coupling from the optical source 22 to the optical sensor 23.

An optical fibre 5, forming a branch of a TPON network such as that shown in FIG. 1, is optically coupled to the optical source 22 at the optical transmitter 20.

The servo controller 21 has two inputs. A demand value DEMAND, representative of an intended operating power of the optical source 22, is applied to the first input of the servo controller 21. The second input of the servo controller 21 receives a monitoring signal MONITOR produced by the optical sensor 23. The monitoring signal MONITOR provides a measure of the optical output power of the optical source 22.

The servo controller 21 serves to Generate a drive signal DRIVE which is modulated in accordance with a data signal DATA (including control and/or data pulses) applied to the servo controller 21, and which is applied to the optical source 22 to control its optical output power in such a way that that optical power is maintained, by servo operation, substantially at the intended operating level during use of the optical transmitter 20, irrespective of variations in the optical source characteristics caused for example by ageing of the source and by temperature effects.

When the optical transmitter 20 of FIG. 3 is first turned on, the servo controller 21 performs a predetermined power setting operation to bring the optical output power of the optical source 22 to the predetermined demand level. A previously-used power setting operation, referred to as a linear power setting operation, is illustrated in FIG. 4.

In FIG. 4, the drive signal DRIVE applied to the optical source 22 by the servo controller 21 is modulated (by control pulses in the data signal DATA) to cause the optical source to produce a ranging pulse RP in the phase 1 ranging portion of each successive upstream TDMA multiframe. The servo controller 21 increases the drive signal value used to transmit the successive ranging pulses RP from zero towards a predetermined maximum drive signal value MAX, the change in the drive signal value from one ranging pulse to the next being a fixed amount ADJ. The amount ADJ is determined in dependence upon the required accuracy of the power setting operation, and may be, for example, less than 1% of the predetermined maximum drive signal value MAX.

The power of the ranging pulses therefore increases substantially linearly in accordance with the rising value of the drive signal DRIVE. The servo controller 21 employs the monitoring signal MONITOR produced by the optical sensor 23 to determine whether or not the optical power of each ranging pulse $RP_1$, $RP_2$ . . . exceeds the predetermined demand value DEMAND. The power setting operation is terminated following generation of the first ranging pulse whose optical power exceeds the demand level.

In such a linear power setting operation as shown in FIG. 4, when the demand value DEMAND is relatively high, many ranging pulses RP may need to be transmitted before the output power reaches the demand value. This delays the initialisation of a newly-connected termination.

FIG. 5 shows a block diagram of parts of an optical transmitter 30 embodying the present invention. The optical transmitter 30 includes a servo controller 31, a programmable current generator 32, for example a digital-to-analogue converter (DAC), an integrator 34, a laser drive circuit 36, a semiconductor laser 38, a monitor photodiode 40, an amplifier 42 and a comparator 44.

The servo controller 31 applies a digital control word CONT to the programmable current generator 32. The current generator 32 includes a current source/sink, the sign and magnitude of whose output current are programmable by means of the control word CONT. The programmable output current $I_p$ of the current generator 32 is applied to the input of the integrator 34 so that the integrator 34 integrates the output current $I_p$ to produce a steadily rising or falling (depending on the sign of the programmable output current $I_p$) output voltage $V_p$. The rate of ramping is determined by the magnitude of the output current $I_p$. Thus, the programmable current generator 32 and the integrator 34 together serve as a programmable ramp voltage generator, the direction and rate of ramping both being controlled in dependence upon the control word CONT applied to the current generator 32 by the servo controller 31.

The programmable ramp voltage $V_p$ is applied to the laser drive circuit 36 which produces a laser drive current $I_D$ which changes linearly with the programmable ramp voltage $V_p$. The laser drive current $I_D$ is modulated by an upstream data signal DATA. Thus, the laser 38 transmits optical pulses, of an optical power dependent upon the laser drive $I_D$, in accordance with data (or control) pulses included in the upstream data signal DATA.

The optical pulses Generated by the semiconductor laser 38 are detected by the monitor photodiode 40 which is coupled optically to the laser 38. For example, the photodiode 40 may be in the same package as the laser 38. The amplifier 42 amplifies the electrical pulses produced by the monitor photodiode 40 to produce a monitoring signal $V_m$ which is applied to one input of the comparator 44. A predetermined demand voltage $V_{demand}$ is applied to the other input of the comparator 44. Thus, the comparator 44 serves to produce a logic signal (direction signal) DIR whose logic level is dependent upon whether or not the monitoring signal $V_m$ exceeds the demand voltage $V_{demand}$. For example, the signal DIR may have a "1" level when $V_m \leq V_{demand}$ and a "0" level when $V_m > V_{demand}$. The direction signal DIR is latched by the servo controller 31, and is used by the controller to determine one bit of the control word CONT, which bit controls the sign of the programmable output current $I_p$.

Figure 6:
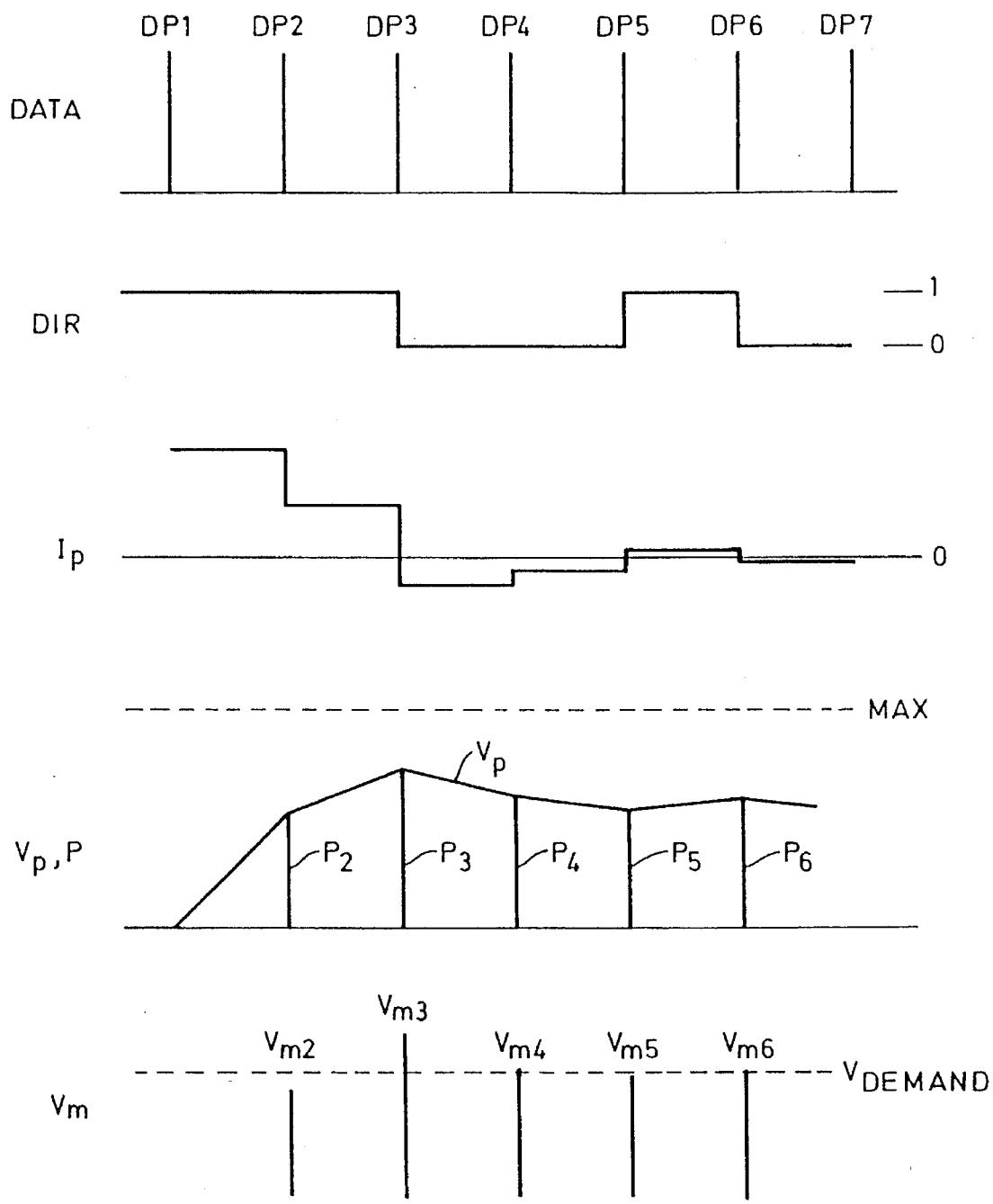
FIG. 6 shows a timing diagram for illustrating operation of the FIG. 5 optical transmitter.

The optical transmitter 30 of FIG. 5 has two different modes of operation. In a power setting mode, used when the optical transmitter 30 is first connected to its intended TPON network, the servo controller 31 is required to set the output power of the semiconductor laser to a predetermined accuracy as quickly as possible. In a TPON network, a newly-connected optical transmitter is required to produce a succession of phase 1 ranging pulses as described above with reference to FIG. 2. Thus, as shown in FIG. 6, the upstream data signal DATA consists of short pulses $DP_1$, $DP_2$ ..., of duration 1 bit period (48.8 ns) or, in the case of return-to-zero modulation format, ½ bit period (24.4 ns), at regular intervals of 10 ms.

Initially, the integrator 34 is maintained in a reset condition so that the programmable ramp voltage $V_p$ is held at zero. Thus, in response to the first data pulse $DP_1$ in the data signal DATA, no optical pulse is produced by the semiconductor laser 38. Since no optical pulse is produced, the monitoring signal $V_m$ at the time of first data pulse $DP_1$ will be less than the demand voltage $V_{demand}$. Thus, the direction signal DIR has the high logic level ("1") after the first data pulse $DP_1$.

The servo controller 31 initially applies a control word CONT to the programmable current generator 32 which causes the programmable current $I_p$ to have a magnitude equal to half the full scale current value $I_{max}$ of the current generator 32 and a positive sign (in accordance with the "1" level of the direction signal DIR).

The first data pulse $DP_1$ also removes the reset condition in the integrator 34, so that the integrator 34 starts to operate. Accordingly, the programmable ramp voltage $V_p$ ramps up at half its maximum rate, reaching 50% of its full scale voltage value by the time the next data pulse $DP_2$ arrives.

Accordingly, an optical pulse $P_2$ is produced in response to the second data pulse $DP_2$, and is nominally of a power approximately equal to half of the maximum output power of the semiconductor laser 38. In practice, the laser output characteristic varies from one laser to another and also with laser age and temperature, so that the actual output power in response to any given drive current $I_D$ cannot be precisely predicted. This, however, is of no consequence in the FIG. 5 optical transmitter.

The optical pulse $P_2$ produces a corresponding pulse, of amplitude $V_{m2}$, in the monitoring signal $V_m$ provided by the amplifier 42. In this case, since $V_{m2}$ is less than $V_{demand}$, the direction signal DIR has the high logic level ("1"). Following the optical pulse $P_2$ the servo controller changes the control word CONT applied to the programmable current generator 32, so as to halve the magnitude of the programmable current $I_p$ and thereby halve the rate of ramping of the programmable ramp voltage $V_p$. Because the direction signal DIR is still at the "1" level the servo controller keeps the programmable current $I_p$ positive so that the programmable ramp voltage $V_p$ continues to ramp upwardly. Thus, following the optical pulse $P_2$ the voltage $V_p$ ramps upwardly at one quarter of its maximum ramping rate, to reach three-quarters of its full scale voltage value by the time the next data pulse $DP_3$ is received.

The optical output pulse $P_3$ produced in response to the third data pulse $DP_3$ therefore has a nominal power level of three-quarters of the maximum output power level. The pulse produced by the amplifier 42 in response to the optical output pulse $P_3$ is of amplitude $V_{m3}$ which, contrary to the case with the previous pulse of amplitude $V_{m2}$, exceeds the demand voltage $V_{demand}$. Accordingly, the direction signal DIR changes to the low logic level ("0"). The servo controller 31 again changes the control word CONT applied to the programmable ramp generator such that the sign of the programmable current $I_p$ becomes negative (current sink) and its magnitude is halved to one eighth of the full scale current value. Accordingly, the programmable ramp voltage $V_p$ begins to ramp downwardly, the rate of ramping being halved to one eighth of the maximum ramping rate.

Operation of the FIG. 5 optical transmitter continues in this way for a predetermined number of data pulses DP. The number of data pulses used in the power setting operation determines the accuracy with which the final optical output power is set, n data pulses DP ensuring an accuracy of one part in $2^n$. For example, if eight data pulses DP are used, the accuracy will be better than 0.4%.

Once the power setting operation is complete, the optical transmitter 30 switches over to its normal mode of operation in which it is required to perform fine adjustment upon the laser output power so as to counteract aging and temperature effects. This is accomplished by applying a fixed control word CONT to the programmable current generator 32 such that the programmable ramp voltage $V_p$ ramps at a very slow rate (for example 1/256 of its maximum ramping rate), the direction of ramping being controlled as before in dependence upon the direction signal DIR.

The optical transmitter of FIG. 5 employs a ramping voltage to control the laser drive current $I_D$. This is advantageous because it avoids step changes in the voltage applied to the laser drive circuit 36, which might lead to unpredictable results. Nonetheless, it will be appreciated that it would alternatively be possible to have the voltage applied to the laser drive circuit change stepwise between successive data pulses DP.

It will be appreciated that, although the foregoing embodiment of the present invention has been described in the context of a TPON network, in other embodiments the present invention can be applied advantageously to any optical transmitter the optical output power of which is required to settle as quickly as possible to an intended value when the transmitter is initialized.

What I claim is:

1. An optical transmitter comprising:

an optical source;

an optical sensor coupled optically to said optical source for producing monitoring signals indicative of the optical output power thereof; and drive means, connected to said optical sensor for receiving therefrom said monitoring signals and also connected to said optical source for applying thereto drive signals, for controlling the optical output power thereof, and having a power setting mode in which said drive means are operable to apply a first drive signal, having a value equal to half a predetermined maximum drive signal value, to the optical source at a first time instant and to determine, on the basis of the monitoring signal, whether the optical output power of the optical source for the first drive signal value exceeds a predetermined demand level and if so to apply a second drive signal to the optical source at a second time instant, the value of the second drive signal being made smaller than the first drive signal value by one-quarter of said predetermined maximum drive signal value, whereas if the optical output power for the first drive signal value is less than the predetermined demand level the second drive signal value is made greater than the first drive signal value by one-quarter of said predetermined maximum drive signal value, and so on applying further drive signals such that the difference between one of the drive signal values and the next is one-half that between the one drive signal value and the immediately-preceding drive signal value.

2. A transmitter as claimed in claim 1, wherein said drive signals are drive signal pulses produced respectively at said time instants.

3. A transmitter as claimed in claim 2, wherein said optical source is turned off in the intervals between said drive signal pulses.

4. A transmitter as claimed in claim 1, wherein said drive means include:

ramp signal generation means operative to produce a ramp signal which changes linearly in amplitude from one said time instant to the next; and drive signal generation means connected to said ramp signal generation means for receiving therefrom said ramp signal and operative to produce said drive signals in dependence upon the ramp signal amplitude at said time instants.

5. A transmitter as claimed in claim 4, further comprising servo control means connected to said ramp signal generation means for applying thereto control signals, said ramp signal generation means including:

a current generator operative in the interval between one said time instant and the next to produce a constant current whose sign and magnitude are selected by said control signals; and an integrator connected for receiving said constant current and operable to integrate that current over said interval so as to produce said ramp signal.

6. A method for setting the optical output power of an optical transmitter, the transmitter comprising an optical source connected for receiving drive signals used to control the optical output power thereof and also comprising an optical sensor coupled optically to said optical source for producing monitoring signals indicative of said optical output power;

in which method:

a first drive signal, having a value equal to half a predetermined maximum drive signal value, is applied to said optical source at a first time instant and it is determined, on the basis of the monitoring signal, whether the optical output power of the optical source for the first drive signal value exceeds a predetermined demand level and if so a second drive signal is applied to the optical source at a second time instant, the value of the second drive signal being made smaller than the first drive signal value by one-quarter of said predetermined maximum drive signal value, whereas if the optical output power for the first drive signal value is less than said predetermined demand level the second drive signal is made greater than the first drive signal value by one-quarter of said predetermined maximum drive signal value;

and so on applying further drive signals such that the difference between one drive signal value and the next is one-half that between the one drive signal value and the immediately-preceding drive signal value.

7. A telecommunications-over-passive-optical-networks (TPON) network comprising:

a head-end station optical receiver; and an optical transmitter connected to said optical receiver by way of a passive optical network, said optical transmitter comprising:

an optical source;

an optical sensor coupled optically to said optical source for producing monitoring signals indicative of the optical output power thereof; and drive means, connected to said optical sensor for receiving therefrom said monitoring signals and also connected to said optical source for applying thereto drive signal pulses, for controlling the optical output power thereof, and having a power setting mode in which said drive means are operable to apply a first drive signal pulse, having a value equal to half a predetermined maximum drive signal value, to the optical source at a first time instant and to determine, on the basis of the monitoring signal, whether the optical output power of the optical source for the first drive signal pulse value exceeds a predetermined demand level and if so to apply a second drive signal pulse to the optical source at a second time instant, the value of the second drive signal pulse being made smaller than the first drive signal value by one-quarter of said predetermined maximum drive signal pulse value, whereas if the optical output power for the first drive signal pulse value is less than the predetermined demand level the second drive signal pulse value is made greater than the first drive signal value by one-quarter of said predetermined maximum drive signal value, and so on applying further drive signal pulses such that the difference between one of the drive signal pulse values and the next is one-half that between the one drive signal pulse value and the immediately-preceding drive signal pulse value;

said optical source being turned off in the intervals between said drive signal pulses; and said network being operative in accordance with a bit transport system and said drive signal pulses serving to cause the transmitter to produce phase 1 ranging pulses of said bit transport system.

* * * * *